(12) United States Patent
Reddem et al.

(10) Patent No.: US 11,129,006 B2
(45) Date of Patent: Sep. 21, 2021

(54) TOOLKIT MANAGEMENT DURING SUBSCRIPTION DISABLEMENT

(71) Applicant: QUALCOMM Incorporated, San Diego, CA (US)

(72) Inventors: Venkata Konda Reddy Reddem, San Diego, CA (US); Naga Chandan Babu Gudivada, Hyderabad (IN); Kanakathodi Shreyas Hegde, San Diego, CA (US); Rajendra Prasad Nelurouth, Hyderabad (IN); Venkata Durga Vinod Chikkala, Hyderabad (IN); Phani Pradeep Kumar Kothapalli Venkata, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/005,853

(22) Filed: Aug. 28, 2020

(65) Prior Publication Data

US 2021/0067932 A1 Mar. 4, 2021

(30) Foreign Application Priority Data

Aug. 30, 2019 (IN) .............................. 201941034991

(51) Int. Cl.
*H04W 4/60* (2018.01)
*H04W 88/06* (2009.01)

(52) U.S. Cl.
CPC ............. *H04W 4/60* (2018.02); *H04W 88/06* (2013.01)

(58) Field of Classification Search
CPC . H04W 4/60; H04W 52/028; H04W 52/0258; H04W 60/06; H04W 12/08; H04W 52/0274
See application file for complete search history.

(56) References Cited

U.S. PATENT DOCUMENTS

| | | | | |
|---|---|---|---|---|
| 6,978,157 | B1* | 12/2005 | Amiens | H04L 63/10 455/420 |
| 8,774,864 | B2* | 7/2014 | Kumar | H04W 8/24 455/558 |
| 2006/0003778 | A1* | 1/2006 | Hogdahl | G08B 25/002 455/466 |
| 2006/0212482 | A1* | 9/2006 | Celik | H04M 1/2745 |
| 2007/0055897 | A1* | 3/2007 | Bussan | G06K 19/073 713/300 |
| 2013/0148574 | A1* | 6/2013 | Liu | H04W 52/0222 370/328 |
| 2015/0349826 | A1* | 12/2015 | Li | H04W 8/183 455/558 |

(Continued)

*Primary Examiner* — Dung Hong
(74) *Attorney, Agent, or Firm* — Qualcomm Incorporated

(57) ABSTRACT

Methods, systems, and devices for multi-subscription management are described. A user equipment (UE) supporting a dual-subscriber identify module (SIM) configuration may identify a message to disable a subscription associated with a first SIM of a dual-SIM universal SIM (USIM) card. Disabling the first SIM may include powering down a modem stack associated with the first SIM while maintaining power to the first SIM. The UE may configure a SIM toolkit manager associated with a SIM toolkit for the first SIM to a disabled state based at least in part on the message. The UE may then indicate to the first SIM that the SIM toolkit manager is in the disabled state.

20 Claims, 11 Drawing Sheets

(56) References Cited

U.S. PATENT DOCUMENTS

| | | | |
|---|---|---|---|
| 2017/0208603 A1* | 7/2017 | Goel | H04W 48/16 |
| 2017/0280437 A1* | 9/2017 | Xu | H04W 76/10 |
| 2019/0166491 A1* | 5/2019 | Lokasaari | H04W 76/36 |
| 2020/0275262 A1* | 8/2020 | Su | H04W 8/183 |
| 2020/0288298 A1* | 9/2020 | Li | H04W 12/35 |

* cited by examiner

TOOLKIT MANAGEMENT DURING SUBSCRIPTION DISABLEMENT

CROSS REFERENCE

The present application for patent claims the benefit of India Provisional Patent Application No. 201941034991 by REDDEM et al., entitled "TOOLKIT MANAGEMENT DURING SUBSCRIPTION DISABLEMENT," filed Aug. 30, 2019, assigned to the assignee hereof, and expressly incorporated by reference herein.

BACKGROUND

The following relates generally to multi-subscription management, and more specifically to toolkit management during subscription disablement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may support communications using multiple subscriptions corresponding to multiple subscription identify module (SIM) cards.

SUMMARY

The described techniques relate to improved methods, systems, devices, and apparatuses that support toolkit management during subscription disablement. Generally, the described techniques provide for disabling a first subscription of a dual-subscriber identity module (SIM) device while maintaining power for a SIM card providing the first subscription. A user equipment (UE) may have a dual-SIM universal SIM (USIM) card to store a first SIM for a first subscription and a second SIM for a second subscription. Each SIM may include a SIM modem stack and a SIM toolkit manager. The SIM modem stack may handle network communications associated with the subscription, and the SIM toolkit manager may configure and manage a SIM toolkit associated with the SIM. The SIM toolkit may enable an application, stored in a universal integrated circuit card (UICC), to interact and operate with terminals (e.g., the UE, other UEs, base stations, etc.) that support mechanisms used by the application. The SIM toolkit for a subscription may, in some cases, operate independently of the UE and the network associated with the subscription.

The UE may support disabling one or more of the subscriptions while maintaining power for the associated SIM card. To prevent potentially disruptive signaling from the disabled subscription, the UE may support setting both the SIM modem stack and the SIM toolkit manager to a disabled state. Therefore, when the UE is configured to disable a subscription, the UE may disable both the SIM modem stack and the SIM toolkit manager for the SIM card providing the subscription. Disabling the SIM toolkit may prevent signaling from the SIM from interrupting the UE in addition to disabling network communications for the associated subscription. The SIM toolkit manager may have two states, including an enabled state and a disabled state. If the modem subscription is disabled, the modem SIM toolkit manager may be set to the disabled state. If the modem subscription is enabled, the modem SIM toolkit manager may be set to the enabled state. Additional techniques are described to prevent services associated with a SIM (e.g., USIM services) from triggering when the SIM is disabled.

A method of multi-subscription management is described. The method may include identifying a message to disable a subscription associated with a first SIM of a dual-SIM USIM card, where disabling the first SIM includes powering down a modem stack associated with the first SIM while maintaining power to the first SIM, configuring a SIM toolkit manager associated with a SIM toolkit for the first SIM to a disabled state based on the message, and indicating to the first SIM that the SIM toolkit manager is in the disabled state.

An apparatus for multi-subscription management is described. The apparatus may include a processor, memory coupled with the processor, and instructions stored in the memory. The instructions may be executable by the processor to cause the apparatus to identify a message to disable a subscription associated with a first SIM of a dual-SIM USIM card, where disabling the first SIM includes powering down a modem stack associated with the first SIM while maintaining power to the first SIM, configure a SIM toolkit manager associated with a SIM toolkit for the first SIM to a disabled state based on the message, and indicate to the first SIM that the SIM toolkit manager is in the disabled state.

Another apparatus for multi-subscription management is described. The apparatus may include means for identifying a message to disable a subscription associated with a first SIM of a dual-SIM USIM card, where disabling the first SIM includes powering down a modem stack associated with the first SIM while maintaining power to the first SIM, configuring a SIM toolkit manager associated with a SIM toolkit for the first SIM to a disabled state based on the message, and indicating to the first SIM that the SIM toolkit manager is in the disabled state.

A non-transitory computer-readable medium storing code for multi-subscription management is described. The code may include instructions executable by a processor to identify a message to disable a subscription associated with a first SIM of a dual-SIM USIM card, where disabling the first SIM includes powering down a modem stack associated with the first SIM while maintaining power to the first SIM, configure a SIM toolkit manager associated with a SIM toolkit for the first SIM to a disabled state based on the message, and indicate to the first SIM that the SIM toolkit manager is in the disabled state.

Some examples of the method, apparatuses, and non-transitory computer-readable medium described herein may further include operations, features, means, or instructions for identifying that an additional terminal profile command service may be available, and sending an additional terminal profile command to the dual-sim USIM card indicating a lack of support for the SIM toolkit.

Some examples of the method, apparatuses, and non-transitory computer-readable medium described herein may further include operations, features, means, or instructions for receiving, from the dual-sim USIM card, an error notification in response to the additional terminal profile command, resetting the first SIM to a recovery mode based on the error notification, where the resetting includes a UICC initialization, and refraining from sending, in response to the UICC initialization, a terminal profile command indicating support for the SIM toolkit.

In some examples of the method, apparatuses, and non-transitory computer-readable medium described herein, the additional terminal profile command includes a set of terminal profile bytes set to zero.

In some examples of the method, apparatuses, and non-transitory computer-readable medium described herein, the additional terminal profile command service, when available, may be capable of triggering with the SIM toolkit manager in the disabled state.

Some examples of the method, apparatuses, and non-transitory computer-readable medium described herein may further include operations, features, means, or instructions for identifying that the dual-sim USIM card may be inactive, resetting the first SIM to a recovery mode, where the resetting includes a UICC initialization, and refraining from sending, in response to the UICC initialization, a terminal profile command indicating support for the SIM toolkit, where configuring the SIM toolkit manager includes the refraining.

Some examples of the method, apparatuses, and non-transitory computer-readable medium described herein may further include operations, features, means, or instructions for receiving, from the SIM toolkit manager, a request for a proactive command based on the first SIM having a faulty configuration, retrieving the proactive command based on the request, and sending a permanent error response to the first SIM based on the first SIM having the faulty configuration.

In some examples of the method, apparatuses, and non-transitory computer-readable medium described herein, configuring the SIM toolkit manager to the disabled state may include operations, features, means, or instructions for disabling a proactive polling for the SIM toolkit manager.

Some examples of the method, apparatuses, and non-transitory computer-readable medium described herein may further include operations, features, means, or instructions for identifying a request to re-enable the subscription associated with the first SIM, where re-enabling the first SIM includes powering up the modem stack associated with the first SIM, and configuring the SIM toolkit manager to an enabled state based on the request.

DETAILED DESCRIPTION

Figure 1:
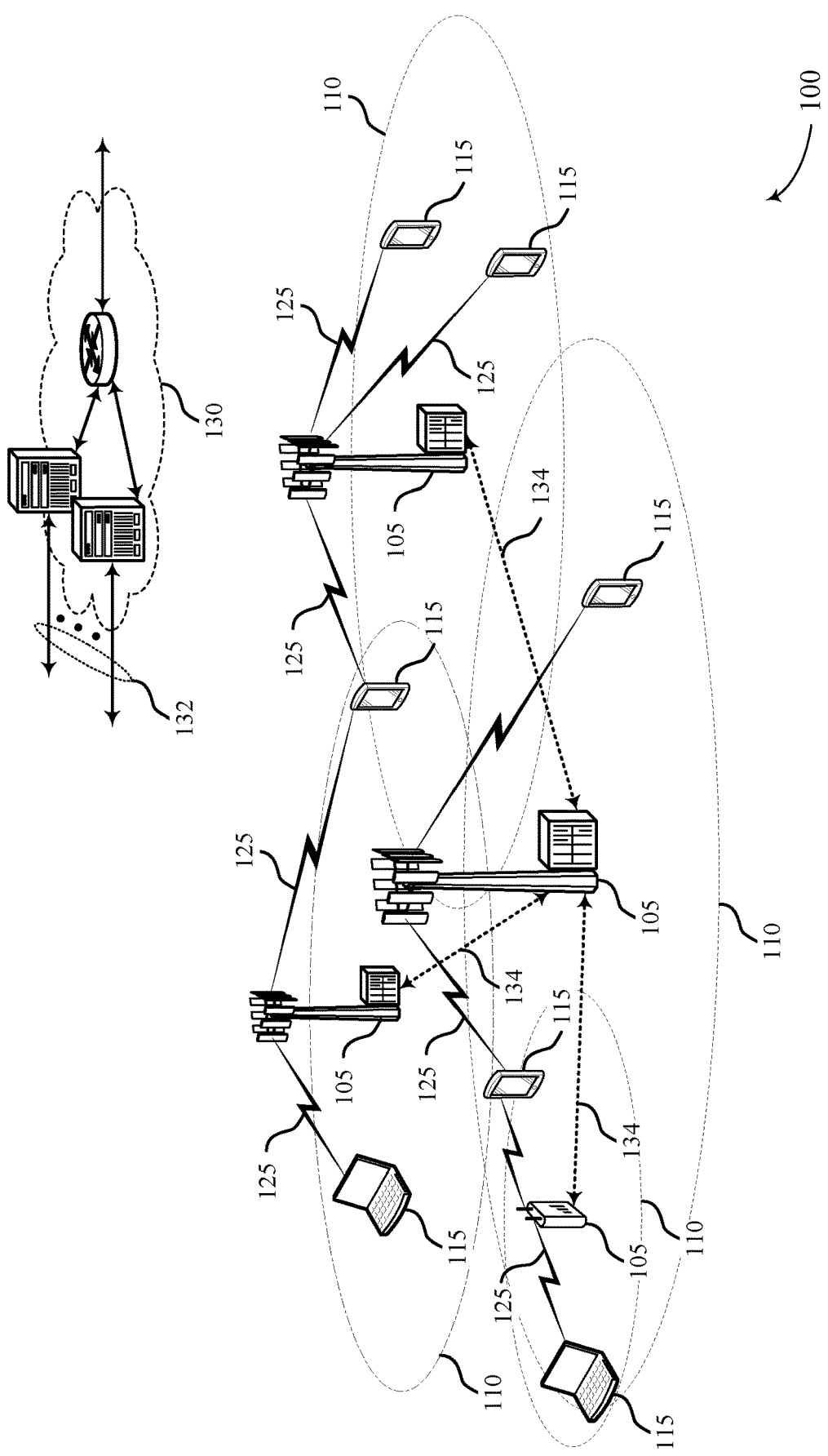
FIG. 1 illustrates an example of a system for multi-subscription management that supports toolkit management during subscription disablement in accordance with aspects of the present disclosure.

A wireless communications system may include devices which support multiple wireless subscriptions. For example, a user equipment (UE) may use multiple subscriber identify module (SIM) cards to communicate using the multiple wireless subscriptions. A UE may have a dual-SIM universal SIM (USIM) card to store a first SIM for a first subscription and a second SIM for a second subscription. Each SIM may include a SIM modem stack and a SIM toolkit manager. The SIM modem stack may handle network communications associated with the subscription, and the SIM toolkit manager may configure and manage a SIM toolkit. The SIM toolkit may enable an application, stored in a universal integrated circuit card (UICC), to interact and operate with terminals (e.g., the UE, other UEs, base stations, etc.) that support mechanisms used by the application. The SIM toolkit for a subscription may, in some cases, operate independently of the UE and the network associated with the subscription. In some cases, a SIM toolkit for a subscription may present information on a display of the UE associated with the subscription, pop up messages, request a user input, etc.

In some cases, a high-level operating system (HLOS) operating on the UE may support disabling one or more of the subscriptions while maintaining power for the associated SIM card. Maintaining power to the disabled SIM card may provide some advantages, such as fast switching between subscriptions or fast reconfiguring of a disabled SIM card. In some cases, a dual-SIM UE may be changed to, or behave similarly to, a single-SIM device by disabling the modem subscription for one of the SIM cards. For example, the UE may disable a SIM modem stack of a SIM card, such that network communications are only enabled using the other SIM card. However, disabling the modem stack for the SIM card may not prevent all mechanisms of the subscription. For example, a SIM toolkit of the SIM card may still operate and perform actions which may affect the performance of the non-disabled SIM or present windows, pop-ups, etc., to a user facilitating the UE. This may lead to poor user experience if the user expects the second SIM card to be disabled, and some actions performed by the SIM card with the disabled SIM modem stack may consume significant power despite the SIM card not being actively used.

The following describes techniques for enhanced SIM disabling while maintaining power for the SIM. When a SIM is disabled, the UE may disable both the SIM modem stack and the SIM toolkit manager for the SIM. This may prevent the SIM toolkit of a SIM from interrupting the UE despite other components of the SIM (e.g., the SIM modem stack) being disabled. The SIM toolkit manager may have two states, including an enabled state and a disabled state. If the modem subscription is disabled, the modem SIM toolkit manager may be set to the disabled state. If the modem subscription is enabled, the modem SIM toolkit manager may be set to the enabled state. Additional techniques are described to prevent services associated with a SIM (e.g., USIM services) from triggering when the SIM is disabled.

Aspects of the disclosure are initially described in the context of a wireless communications system. Aspects of the disclosure are further illustrated by and described with reference to apparatus diagrams, diagrams, and flowcharts that relate to toolkit management during subscription disablement.

FIG. 1 illustrates an example of a wireless communications system 100 that supports toolkit management during subscription disablement in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may use have a dual-SIM USIM card to store a first SIM for a first subscription and a second SIM for a second subscription. Each SIM may include a SIM modem stack and a SIM toolkit manager. The SIM modem stack may handle network communications associated with the subscription, and the SIM toolkit manager may configure and manage a SIM toolkit. The SIM toolkit may enable an application, stored in a UICC, to interact and operate with terminals (e.g., the UE 115, other UEs 115, base stations 105, etc.) that support mechanisms used by the application. The SIM toolkit for a subscription may, in some cases, operate independently of the UE 115 and the network associated with the subscription.

The UE 115 may support disabling one or more of the subscriptions while maintaining power for the associated SIM card. To prevent any signaling from the disabled subscription, the UE 115 may support setting both the SIM modem stack and the SIM toolkit manager to a disabled state. Therefore, when the UE 115 is configured to disable a subscription, the UE 115 may disable both the SIM modem stack and the SIM toolkit manager for the SIM card providing the subscription. Disabling the SIM toolkit may prevent signaling from the SIM from interrupting the UE 115 in addition do disabling network communications for the associated subscription. The SIM toolkit manager may have two states, including an enabled state and a disabled state. If the modem subscription is disabled, the modem SIM toolkit manager may be set to the disabled state. If the modem subscription is enabled, the modem SIM toolkit manager may be set to the enabled state. Additional techniques are described to prevent services associated with a SIM (e.g., USIM services) from triggering when the SIM is disabled.

Figure 2:
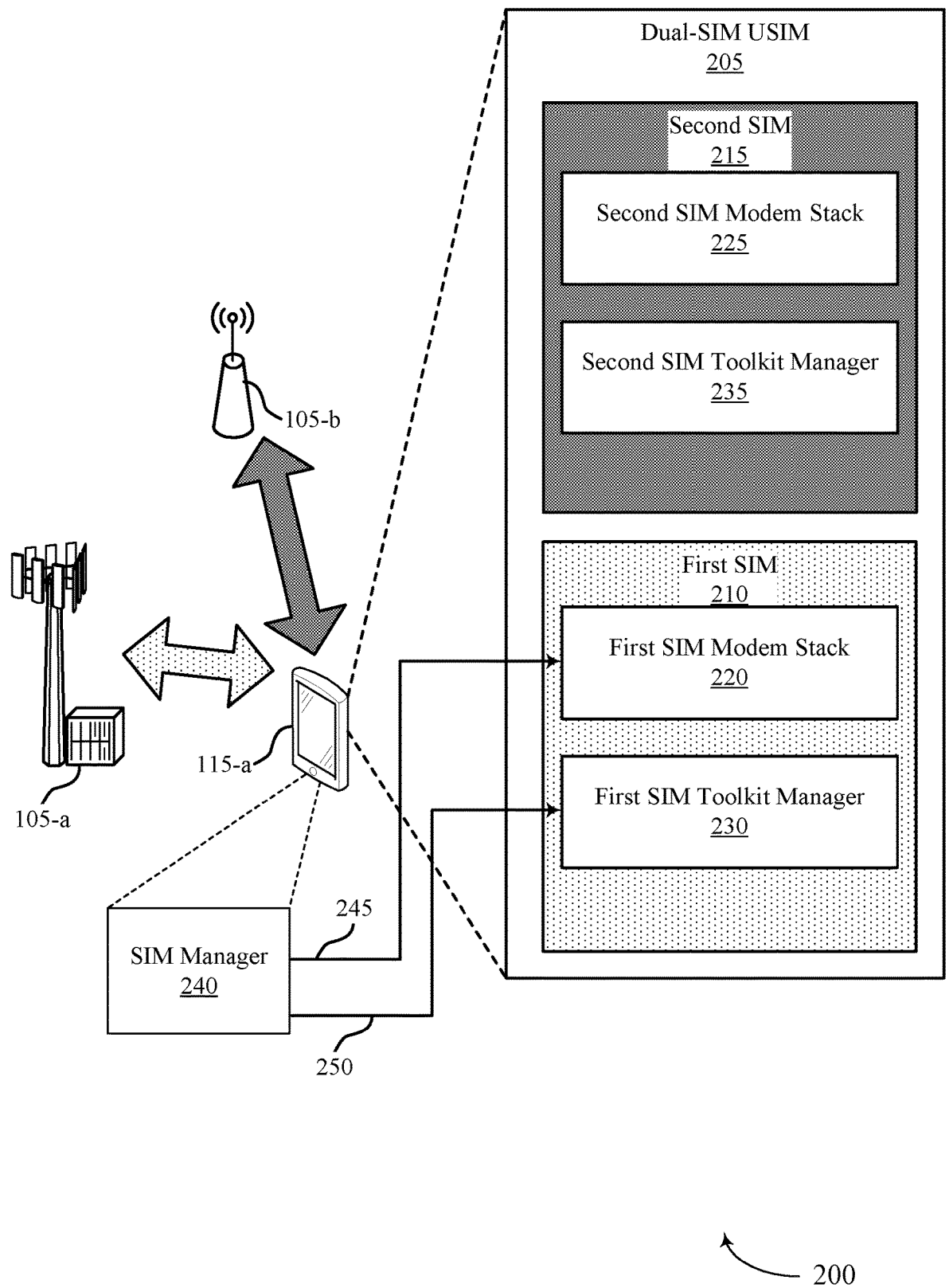
FIG. 2 illustrates an example of a wireless communications system that supports toolkit management during subscription disablement in accordance with aspects of the present disclosure.

FIG. 2 illustrates an example of a wireless communications system 200 that supports toolkit management during subscription disablement in accordance with aspects of the present disclosure. In some examples, wireless communications system 200 may implement aspects of wireless communications system 100. The wireless communications system 200 includes UE 115-a, base station 105-a, and base station 105-b, which may be examples of corresponding devices as described with reference to FIG. 1.

The wireless communications system 200 may support devices with a multi-SIM configuration. For example, UE 115-a may be capable of communicating using a first subscription via a first SIM 210 and a second subscription via a second SIM 215. A dual-SIM universal SIM (USIM) 205 at the UE 115-a may store the first SIM 210 and the second SIM 215. The dual-SIM USIM 205 may enable UE 115-a to use the first SIM 210 for a first type of communication and to use the second SIM 215 to for a second type of communication. In an example, UE 115-a use the first SIM 210 to communicate with base station 105-a using a first radio access technology (RAT) and the second SIM 215 to communicate with base station 105-b using a second RAT. In some cases, UE 115-a may communicate using the first and second subscriptions simultaneously, or UE 115-a may use one subscription at a time.

Each SIM card may include a SIM modem stack and a SIM toolkit manager. The SIM modem stack may include modules and components to handle network communications using the SIM card. For example, a first SIM modem stack 220 may process communications with base station 105-a using the first subscription, and a second SIM modem stack 225 may process communications with base station 105-b using the second subscription.

Each SIM may have a SIM toolkit, in some cases referred to as a card application toolkit (CAT). A SIM toolkit may enable an application, existing in a universal integrated circuit card (UICC), to interact and operate with a terminal (e.g., UEs 115 including UE 115-a, other UEs 115, base stations 105, or other wireless devices) that supports mechanisms used by the application. The SIM toolkit for a subscription may, in some cases, operate independently of UE 115-a and the network associated with the subscription. In some cases, a SIM toolkit for a subscription may present information on a display of the UE 115-a associated with the subscription, request a user input, etc.

Some functionalities of a SIM toolkit may include profile downloading and proactive UICC. A profile download may enable UE 115-a to tell the UICC what UE 115-a is capable of. For example, a profile for UE 115-a, in some cases referred to as a terminal profile, may indicate some capabilities of UE 115-a, including capabilities based on hardware, network conditions, active applications, supported software, etc. When the UICC is initialized, UE 115-a may send its terminal profile to the UICC to indicate which applications, features, or capabilities are supported. Proactive UICC may enable the UICC to initiate actions to be taken by the terminal. For example, the proactive UICC functionality may support the UICC to instruct, indicate, or request UE 115-a to perform various actions. The SIM toolkit may perform a profile download when the UICC is initialized or when SIM toolkit functionality is modified. In some cases, the terminal (e.g., UE 115-a) may send profile download instructions to the UICC as part of a UICC initialization procedure or when the CAT functionality is modified.

Each SIM card may include a SIM toolkit, which may be managed by a SIM toolkit manager. For example, a first SIM toolkit manager 230 may manage a SIM toolkit for the first SIM 210, and a second SIM toolkit manager 235 may manage a SIM toolkit for the second SIM 215. In some examples, the dual-SIM USIM 205 may include a single SIM toolkit manager, which may manage the SIM toolkits for each SIM of the dual-SIM USIM 205, with each SIM having respective configurations, settings, and fields.

In some examples of the wireless communications system 200, a high-level operating system (HLOS) operating on UE 115-*a* may support disabling one or more of the subscriptions while maintaining power for the associated SIM card. In some systems, a SIM card may be fully disabled by turning off power for the entire SIM card. However, disabling components of the SIM card to prevent the subscription from being used while maintaining power to the SIM card may provide some advantages, such as fast switching between subscriptions or fast reconfiguring of a disabled SIM card. Additionally, in some cases it may be beneficial for the dual-SIM USIM 205 to have access to features or contents of the disabled SIM. For example, the dual-SIM USIM 205 may request to identify the operator of the disabled SIM, identification information associated with the disabled SIM, contents of an address book stored on the disabled SIM, etc. Some features and contents may not be accessible if power for the disabled SIM is turned off, so UE 115-*a* (e.g., via the dual-SIM USIM 205) may maintain power for the disabled SIM.

In some cases, UE 115-*a* may be changed to, or behave similarly to, a single-SIM device by disabling the modem subscription for one of the SIM cards. For example, a SIM manager 240 may send a SIM modem stack state toggling signal 245 to disable the first SIM modem stack 220. The SIM modem stack may be disabled by being powered down, or by the UE 115 cutting off or reducing power to the SIM modem stack. While the first SIM modem stack 220 is disabled, UE 115-*a* may not support communications using the first SIM 210, and UE 115-*a* may behave as a single-SIM device supporting communications using the second SIM 215. Generally, a disabled SIM may refer to a SIM with a disabled SIM modem stack, as the UE 115 may not be able to use the associated SIM for network communications.

Some functionality of the SIM manager 240 may be incorporated into functionality of the dual-SIM USIM 205, the first SIM 210, the second SIM 215, or a combination thereof. In some cases, the SIM manager 240 may be executed as an application at UE 115-*a*. For example, a modem or a processor operating in UE 115-*a* may perform the procedure of the SIM manager 240 and handle setting or toggling states of components (e.g., SIM cards of the dual-SIM USIM 205).

In some cases, disabling the modem stack for a SIM may not prevent all mechanisms or signaling of the SIM. For example, a SIM toolkit of a SIM may still operate and perform actions such as the profile download a proactive UICC. The actions of the SIM toolkit may, in some cases, affect the performance of the non-disabled SIM or be presented to a user facilitating UE 115-*a*. For example, the SIM toolkit of the first SIM 210 may present popups if the first SIM 210 is provided power, even if the first SIM modem stack 220 is disabled. This may lead to poor user experience if the user facilitating UE 115-*a* expects the first SIM 210 to be completely disabled.

Additionally, when some RATs are present, a UE 115 may periodically send a signal to its powered SIM cards. The signal may be a command, such as a UICC command, and the UE 115 may periodically poll the powered SIM cards whenever a wireless communications network, such as a 3GPP network, is present. Periodically polling a disabled SIM may consume power even though the UE 115 is not using the disabled SIM, so the disabled SIM may not respond to the polling or may not have pending information to send in response to the polling.

The wireless communications system 200 may implement techniques for enhanced SIM disabling. For example, when a SIM is disabled, UE 115-*a* may disable both the SIM modem stack and the SIM toolkit manager for the SIM. In an example, UE 115-*a* may disable the first SIM 210 to behave as a single-SIM device supporting the second SIM 215. UE 115-*a* may disable the first SIM modem stack 220 and disable the first SIM toolkit manager 230. This may prevent the first SIM toolkit manager 230 from interrupting UE 115-*a* despite other components of the first SIM 210 being disabled. UE 115-*a* may still provide power to the first SIM 210 even though the first SIM modem stack 220 and the first SIM toolkit are disabled, or powered down. By maintaining power for the first SIM 210 even in the disabled state, UE 115-*a* may easily re-enable the first SIM 210 or retrieve information related to the first SIM 210 or information stored at the first SIM 210

UE 115-*a* may toggle a toolkit state of a SIM toolkit to disable the SIM toolkit. For example, modem SIM toolkit manager may have a state machine with two states, including an enabled state (e.g., "toolkit_enabled_st") and a disabled state (e.g., "toolkit_disabled_st"). If the modem subscription is disabled, the modem SIM toolkit manager may move to the disabled state. If the modem subscription is enabled, the modem SIM toolkit manager may move to the enabled state. In an example, the SIM manager 240 may send a SIM toolkit state switching signal 250 to the first SIM toolkit manager 230 to toggle the SIM toolkit between the enabled and disabled state.

There may be some services at a SIM which can trigger even if the SIM modem stack and the SIM toolkit manager are disabled. For example, some USIM services, such as an additional terminal profile command service, may trigger for a SIM card even if both the SIM modem stack and the SIM toolkit for the SIM card are toggled to a disabled state. In some cases, USIM Service no 72 is an example of a service which can trigger even if the SIM modem stack and SIM toolkit are in disabled states. In some examples, these services may be triggered by the UICC. UEs 115 described herein may support configuring the UICC to assume that the UE 115 does not support a SIM toolkit for a disabled SIM.

For example, if a SIM toolkit is disabled, the dual-SIM USIM 205 is active, and the additional USIM service is available, UE 115-*a* may send commands to indicate that UE 115-*a* does not support CAT. UE 115-*a* may send an additional terminal profile command to the UICC with all terminal profile bytes set to '0'. The UICC may then not send any proactive commands to the disabled SIM card.

If the disabled SIM card fails to handle the terminal profile command with the terminal profile bytes set to '0', then UE 115-*a* may reset the disabled SIM in a recovery mode. A SIM card which is reset in recovery mode may restore any applications, settings, etc., which were active or applied just prior to the SIM card getting reset. In comparison, if the SIM card is reset without recovery mode, any applications which were running on the SIM card may be closed, and the applications may be re-initialized or triggered to be re-initialized instead of being restored based on the recovery mode. When the SIM card is reset, UICC initialization may be triggered. As part of UICC initialization, UE 115-*a* may refrain from sending a terminal profile command. The UICC may then assume that UE 115-*a* does not support the toolkit for the disabled SIM, and the UICC may not send proactive commands for the disabled SIM. In some cases, UE 115-*a* may still send a terminal profile command, but the terminal profile bytes in the terminal profile command may be set to '0'.

In some cases, the dual-SIM USIM card 205 may not be active. For example, UE 115-*a* may go into a state where none of the SIM cards are being used (e.g., an airplane mode intended to prevent some types of wireless communications). If UE 115-*a* is then configured to enter a single-SIM state (e.g., with one SIM enabled and one SIM disabled), UE 115-*a* may reset the dual-SIM USIM card 205. UE 115-*a* may reset the card in a recovery mode and, as part of UICC initialization, refrain from sending a terminal profile command. The UICC may then assume that the terminal does not support a CAT for the disabled SIM, and the UICC may refrain from sending any proactive commands for the disabled SIM.

In some cases, the additional USIM service (e.g., USIM Service no 72) may not be available, and UE 115-*a* may enter a single-SIM mode. UE 115-*a* may then reset the dual-SIM USIM card 205. In this example, UE 115-*a* may reset the card in the recovery mode and, as part of UICC initialization, refrain from sending a terminal profile command. The UICC may then assume that the terminal does not support a CAT for the disabled SIM, and the UICC may refrain from sending any proactive commands for the disabled SIM.

In some cases, UE 115-*a* may configure the SIM toolkit and the SIM modem stack to disabled states, but the SIM card may still send a proactive command. For example, the disabled SIM card may have a bug, a faulty configuration, or the SIM card may have a configuration which does not support disabling the SIM card. In this example, UE 115-*a* may fetch the proactive command then send a permanent error code to the SIM card. By sending the permanent error code to the SIM card, the card may not retry the same command. In some cases, not fetching the proactive command may impact a response time for non-toolkit SIM commands, so UE 115-*a* may still fetch the proactive command but send the error message to mitigate the SIM toolkit from sending additional proactive commands.

Once a SIM card has the SIM toolkit and SIM modem stack disabled, proactive polling may also be disabled for the SIM card. Proactive polling may not be valid for a disabled SIM card. Therefore, when a SIM toolkit for a SIM card is set to a disabled state, proactive polling for the SIM card may also be disabled.

Figure 3:
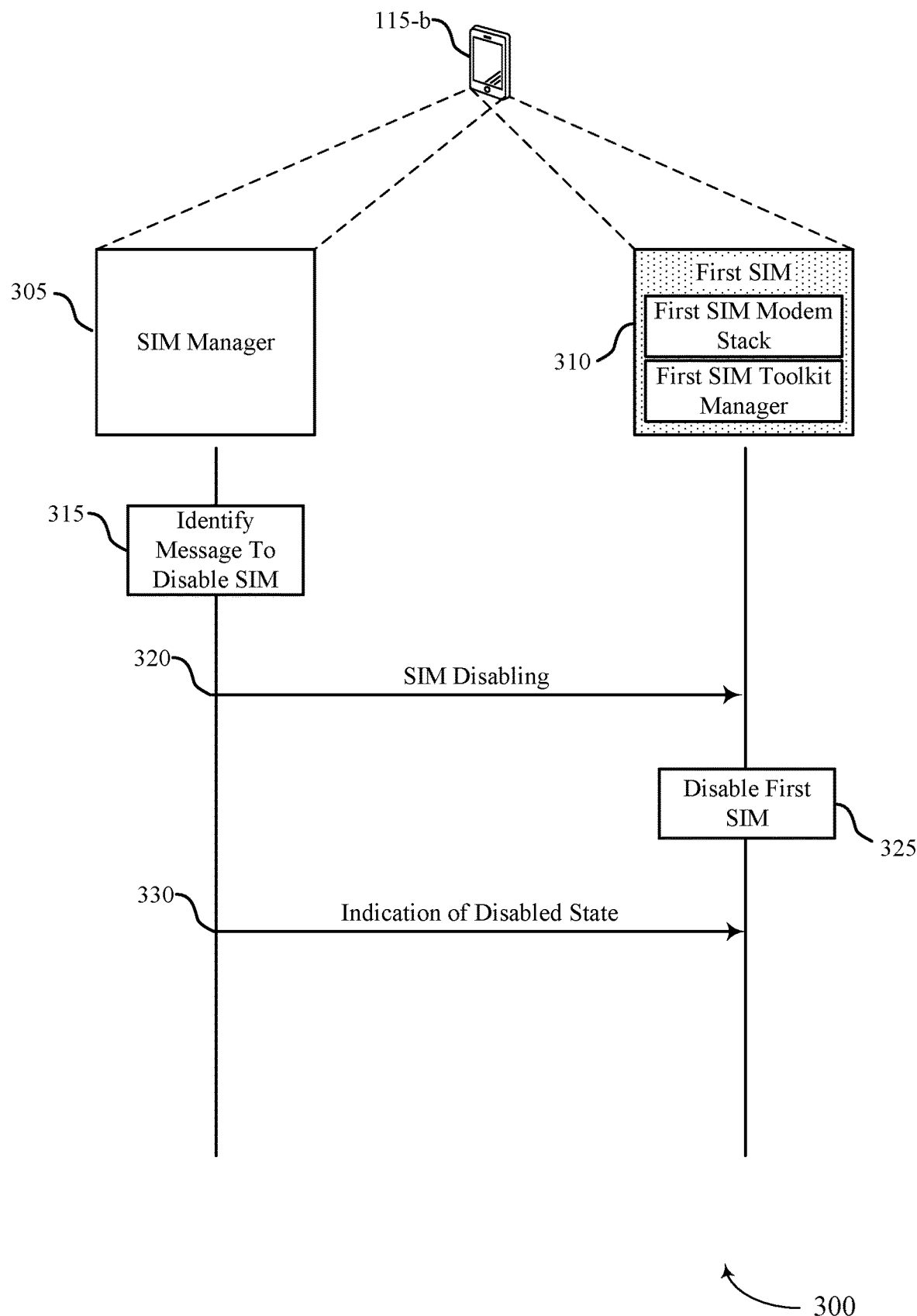
FIG. 3 illustrates an example of a process flow that supports toolkit management during subscription disablement in accordance with aspects of the present disclosure.

FIG. 3 illustrates an example of a process flow 300 that supports toolkit management during subscription disablement in accordance with aspects of the present disclosure. In some examples, the process flow 300 may implement aspects of wireless communications system 100. The process flow 300 may include UE 115-*b*, which may be an example of a UE 115 as described with reference to FIG. 1.

UE 115-*b* may be an example of a dual-SIM device, which can support two different subscriptions corresponding to two different SIM cards. UE 115-*b* may store a dual-SIM USIM card, including a first SIM card 310 for a first subscription and a second SIM card for a second subscription. UE 115-*b* may support disabling one subscription while maintaining power to the corresponding SIM card. Each SIM card at UE 115-*b* may include components such as a SIM modem stack and a SIM toolkit manager. The SIM modem stack may handle network communications, and disabling the SIM modem stack may prevent UE 115-*b* from performing wireless communications using the associated subscription. The SIM toolkit manager may send proactive UICC commands to UE 115-*b* in order to execute applications running on a UICC for the subscription.

In some cases, some operations may be performed by a SIM manager 305 at UE 115-*b*. The SIM manager 305 may, in some cases, correspond to a processor at UE 115-*b* or include aspects of code executing on the processor or a modem at UE 115-*b*. In some cases, some aspects of the SIM manager 305 may be performed by the one or more of the SIM cards stored at UE 115-*b*, including either a first SIM or second SIM card of a dual-SIM USIM or the dual-SIM USIM card itself.

At 315, the SIM manager 305 may identify a message from UE 115-*b* to disable a subscription associated with the first SIM 310 of a dual-SIM USIM card. Disabling the subscription may include powering down the modem stack of the first SIM 310 while maintaining power to the first SIM 310. By powering down the modem stack of the first SIM 310, network communications using the associated subscription may be turned off.

At 320, UE 115-*b* may disable the subscription associated with the first SIM 310. For example, the SIM manager 305 may configure a SIM toolkit manager associated with the SIM toolkit for the first SIM 310 to a disabled state based on the message. In some cases, the SIM manager 305 may send signaling to the first SIM 310 to disable the SIM toolkit associated with the first SIM 310.

At 325, the first SIM 310 may disable the SIM toolkit manager associated with the SIM toolkit of the first SIM 310. In some cases, the SIM toolkit manager may toggle a state in a state machine corresponding to the SIM toolkit from "enabled" to "disabled." In some cases, UE 115-*b* (e.g., via the first SIM 310) may disable proactive polling for the SIM toolkit manager of the first SIM 310. At 330, the SIM manager 305 may send an indication to the first SIM 310 that the SIM toolkit manager of the first SIM 310 is disabled.

Figure 4:
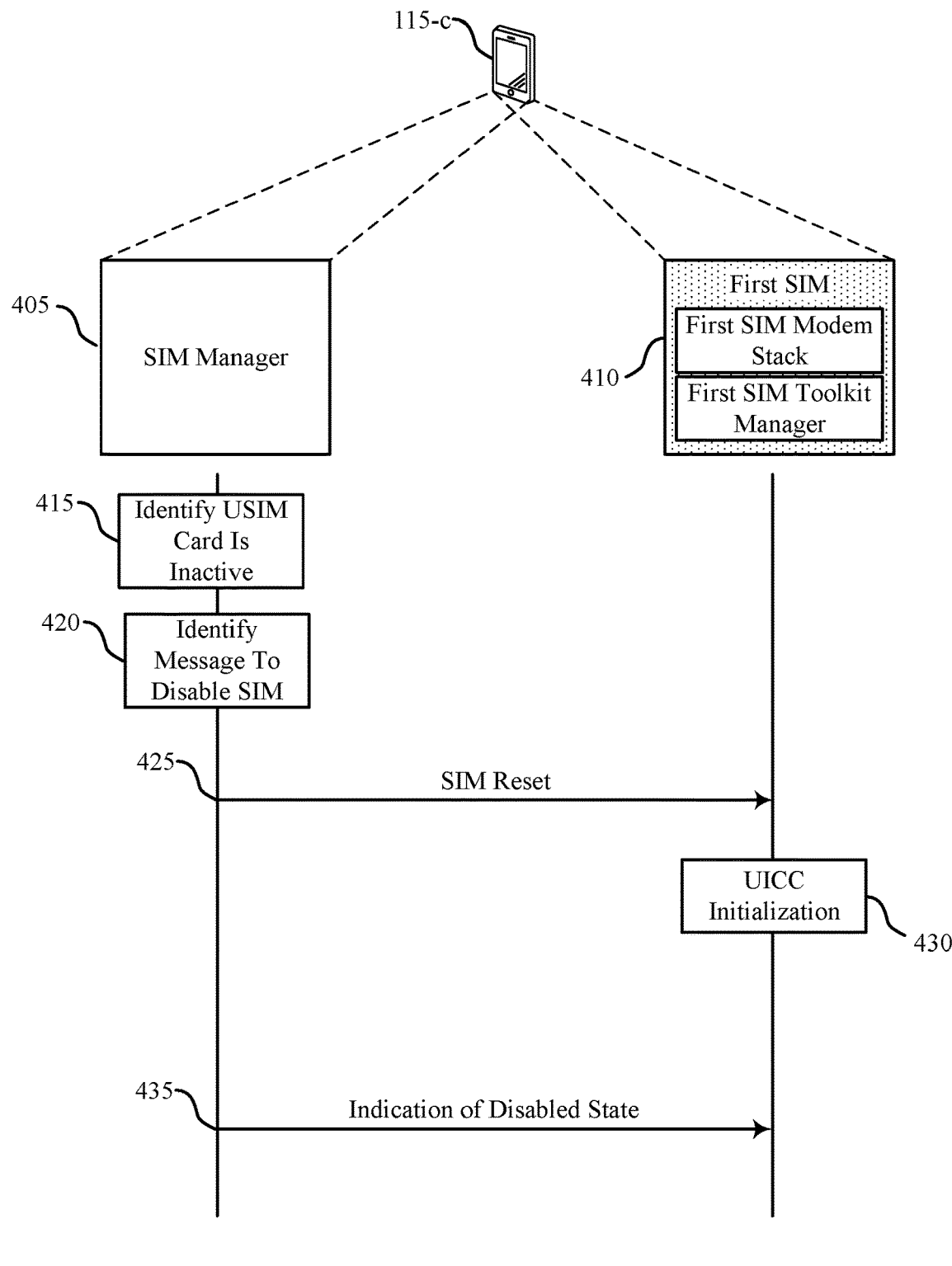
FIG. 4 illustrates an example of a process flow that supports toolkit management during subscription disablement in accordance with aspects of the present disclosure.

FIG. 4 illustrates an example of a process flow 400 that supports toolkit management during subscription disablement in accordance with aspects of the present disclosure. In some examples, process flow 400 may implement aspects of wireless communications system 100.

UE 115-*c* may be an example of a dual-SIM device, which can support two different subscriptions corresponding to two different SIM cards. UE 115-*c* may store a dual-SIM USIM card, including a first SIM card 410 for a first subscription and a second SIM card for a second subscription. UE 115-*c* may support disabling one subscription while maintaining power to the corresponding SIM card. Each SIM card at UE 115-*c* may include components such as a SIM modem stack and a SIM toolkit manager. The SIM modem stack may handle network communications, and disabling the SIM modem stack may prevent UE 115-*c* from performing wireless communications using the associated subscription. The SIM toolkit manager may send proactive UICC commands to UE 115-*c* in order to execute applications running on a UICC for the subscription.

In some cases, some operations may be performed by a SIM manager 405 at UE 115-*c*. The SIM manager 405 may, in some cases, correspond to a processor at UE 115-*c* or include aspects of code executing on the processor or a modem at UE 115-*c*. In some cases, some aspects of the SIM manager 405 may be performed by the one or more of the SIM cards stored at UE 115-*c*, including either a first SIM or second SIM card of a dual-SIM USIM or the dual-SIM USIM card itself.

At 415, UE 115-*c* may identify that the first SIM card 410 is inactive. For example, the dual-sim USIM card may be inactive, such that both SIM cards of the dual-SIM USIM card are inactive. For example, UE 115-*c* may be in an airplane mode, or some other mode where network communications are prevented.

At 420, UE 115-*c* may identify a message to disable a subscription associated with the first SIM 410 of a dual-SIM USIM card. Disabling the subscription to the first SIM 410 may include powering down the modem stack of the first SIM 410 while maintaining power to the first SIM 410.

At 425, UE 115-*c* may send an indication to the first SIM 410 to reset the first SIM 410 to a recovery mode. Resetting the first SIM 410 include a UICC initialization. In response to the UICC initialization, the UE 115-*c* may refrain from sending a terminal profile command indicating support for the SIM toolkit. By refraining from indicating support for the SIM toolkit, the UICC may assume that UE 115-*c* cannot support the SIM toolkit.

At 430, during a UICC initialization, the first SIM 410 may not power on the SIM toolkit manager, or the first SIM 410 may not support the UICC proactive functionality of the SIM toolkit manager. Therefore, the first SIM 410 may reset and provided power, but the modem stack of the first SIM 410 and the SIM toolkit manager for the first SIM 410 may be powered down. At 435, the UE 115-*c* may send an indication to the first SIM 410 that the SIM toolkit manager of the first SIM 410 is disabled.

Figure 5:
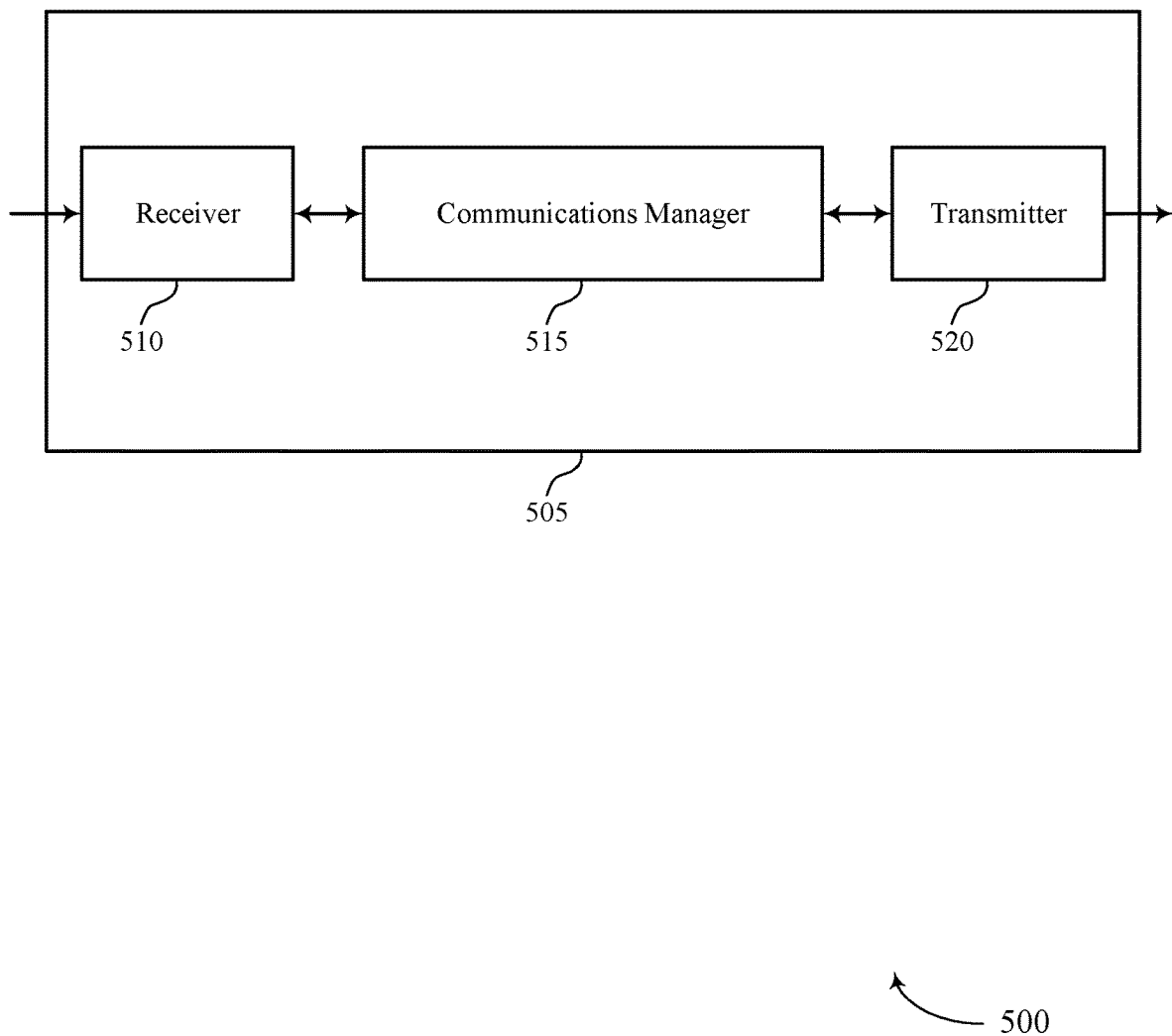
FIGS. 5 and 6 show diagrams of devices that support toolkit management during subscription disablement in accordance with aspects of the present disclosure.

FIG. 5 shows a diagram 500 of a device 505 that supports toolkit management during subscription disablement in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to toolkit management during subscription disablement, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a message to disable a subscription associated with a first SIM of a dual-SIM USIM card, where disabling the first SIM includes powering down a modem stack associated with the first SIM while maintaining power to the first SIM, configure a SIM toolkit manager associated with a SIM toolkit for the first SIM to a disabled state based on the message, and indicate to the first SIM that the SIM toolkit manager is in the disabled state. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
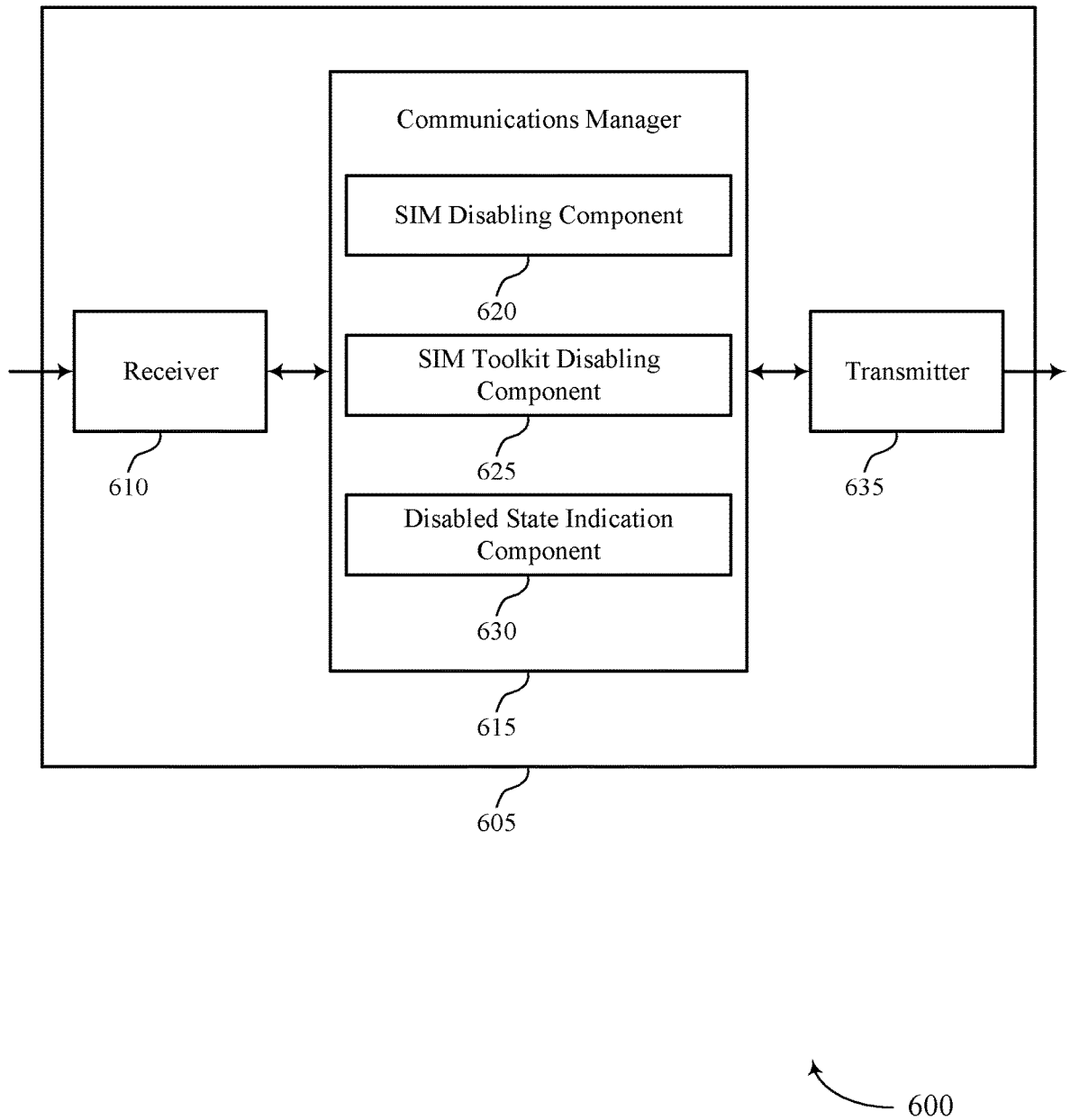

FIG. 6 shows a diagram 600 of a device 605 that supports toolkit management during subscription disablement in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to toolkit management during subscription disablement, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a SIM disabling component 620, a SIM toolkit disabling component 625, and a disabled state indication component 630. The communications manager 615 may be an example of aspects of the communications manager 810 described herein.

The SIM disabling component 620 may identify a message to disable a subscription associated with a first SIM of a dual-SIM USIM card, where disabling the first SIM includes powering down a modem stack associated with the first SIM while maintaining power to the first SIM.

The SIM toolkit disabling component 625 may configure a SIM toolkit manager associated with a SIM toolkit for the first SIM to a disabled state based on the message.

The disabled state indication component 630 may indicate to the first SIM that the SIM toolkit manager is in the disabled state.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
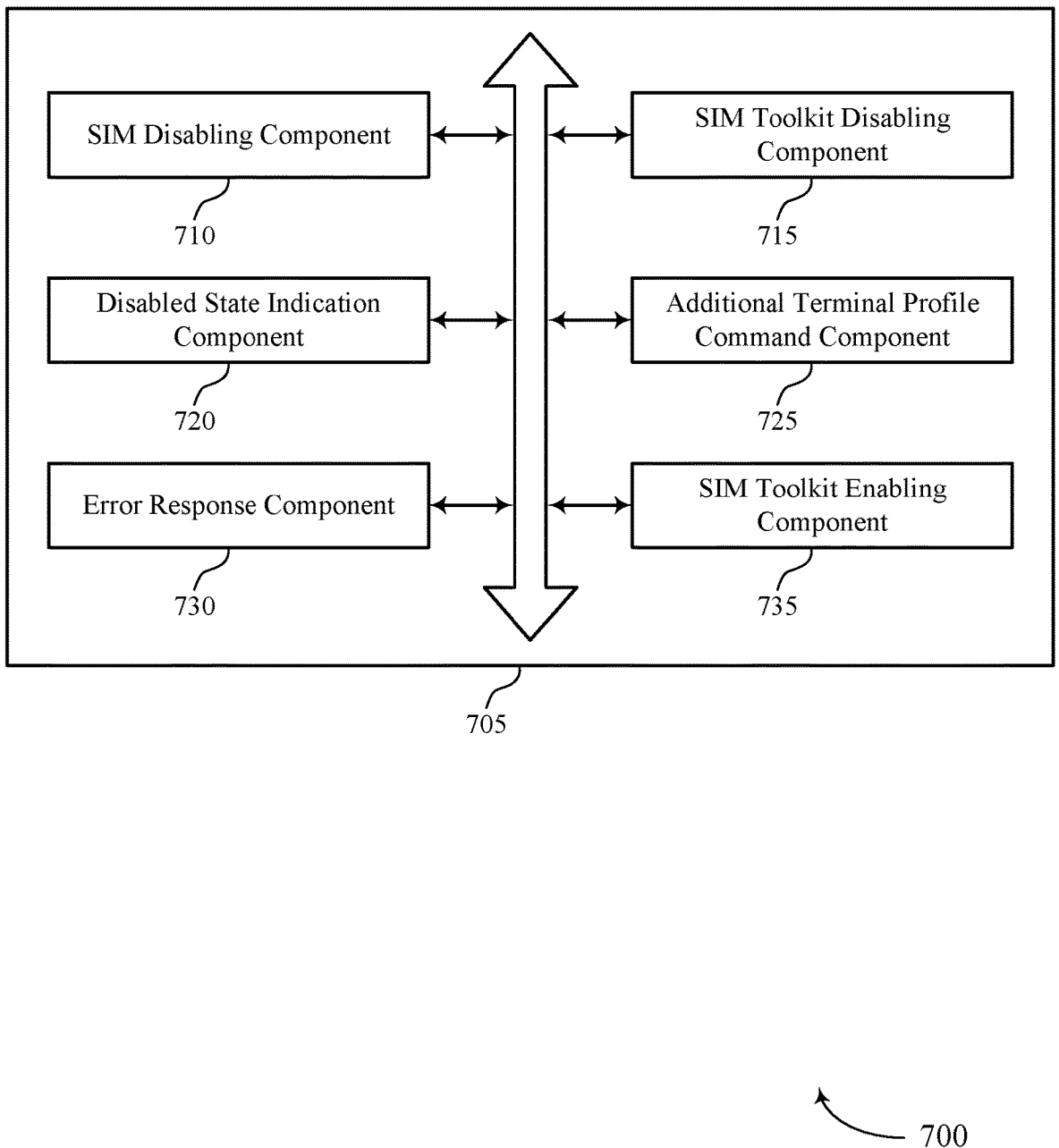
FIG. 7 shows a diagram of a communications manager that supports toolkit management during subscription disablement in accordance with aspects of the present disclosure.

FIG. 7 shows a diagram 700 of a communications manager 705 that supports toolkit management during subscription disablement in accordance with aspects of the present disclosure. The communications manager 705 may be an example of aspects of a communications manager 515, a communications manager 615, or a communications manager 810 described herein. The communications manager 705 may include a SIM disabling component 710, a SIM toolkit disabling component 715, a disabled state indication component 720, an additional terminal profile command component 725, an error response component 730, and a SIM toolkit enabling component 735. Each of these modules may communicate, directly or indirectly, with one another (e.g., via one or more buses).

The SIM disabling component 710 may identify a message to disable a subscription associated with a first SIM of a dual-SIM USIM card, where disabling the first SIM includes powering down a modem stack associated with the first SIM while maintaining power to the first SIM.

The SIM toolkit disabling component 715 may configure a SIM toolkit manager associated with a SIM toolkit for the first SIM to a disabled state based on the message.

In some examples, the SIM toolkit disabling component 715 may identify that the dual-sim USIM card is inactive. In some examples, the SIM toolkit disabling component 715 may reset the first SIM to a recovery mode, where the resetting includes a UICC initialization. In some examples, the SIM toolkit disabling component 715 may refrain from sending, in response to the UICC initialization, a terminal profile command indicating support for the SIM toolkit, where configuring the SIM toolkit manager includes the refraining. In some examples, the SIM toolkit disabling component 715 may disable a proactive polling for the SIM toolkit manager.

The disabled state indication component 720 may indicate to the first SIM that the SIM toolkit manager is in the disabled state.

The additional terminal profile command component 725 may identify that an additional terminal profile command service is available. In some examples, the additional terminal profile command component 725 may send an additional terminal profile command to the dual-sim USIM card indicating a lack of support for the SIM toolkit.

In some examples, the additional terminal profile command component 725 may receive, from the dual-sim USIM card, an error notification in response to the additional terminal profile command. In some examples, the additional terminal profile command component 725 may reset the first SIM to a recovery mode based on the error notification, where the resetting includes a UICC initialization. In some examples, the additional terminal profile command component 725 may refrain from sending, in response to the UICC initialization, a terminal profile command indicating support for the SIM toolkit.

In some cases, the additional terminal profile command includes a set of terminal profile bytes set to zero. In some cases, the additional terminal profile command service, when available, is capable of triggering with the SIM toolkit manager in the disabled state.

The error response component 730 may receive, from the SIM toolkit manager, a request for a proactive command based on the first SIM having a faulty configuration. In some examples, the error response component 730 may retrieve the proactive command based on the request. In some examples, the error response component 730 may send a permanent error response to the first SIM based on the first SIM having the faulty configuration.

The SIM toolkit enabling component 735 may identify a request to re-enable the subscription associated with the first SIM, where re-enabling the first SIM includes powering up the modem stack associated with the first SIM. In some examples, the SIM toolkit enabling component 735 may configure the SIM toolkit manager to an enabled state based on the request.

Figure 8:
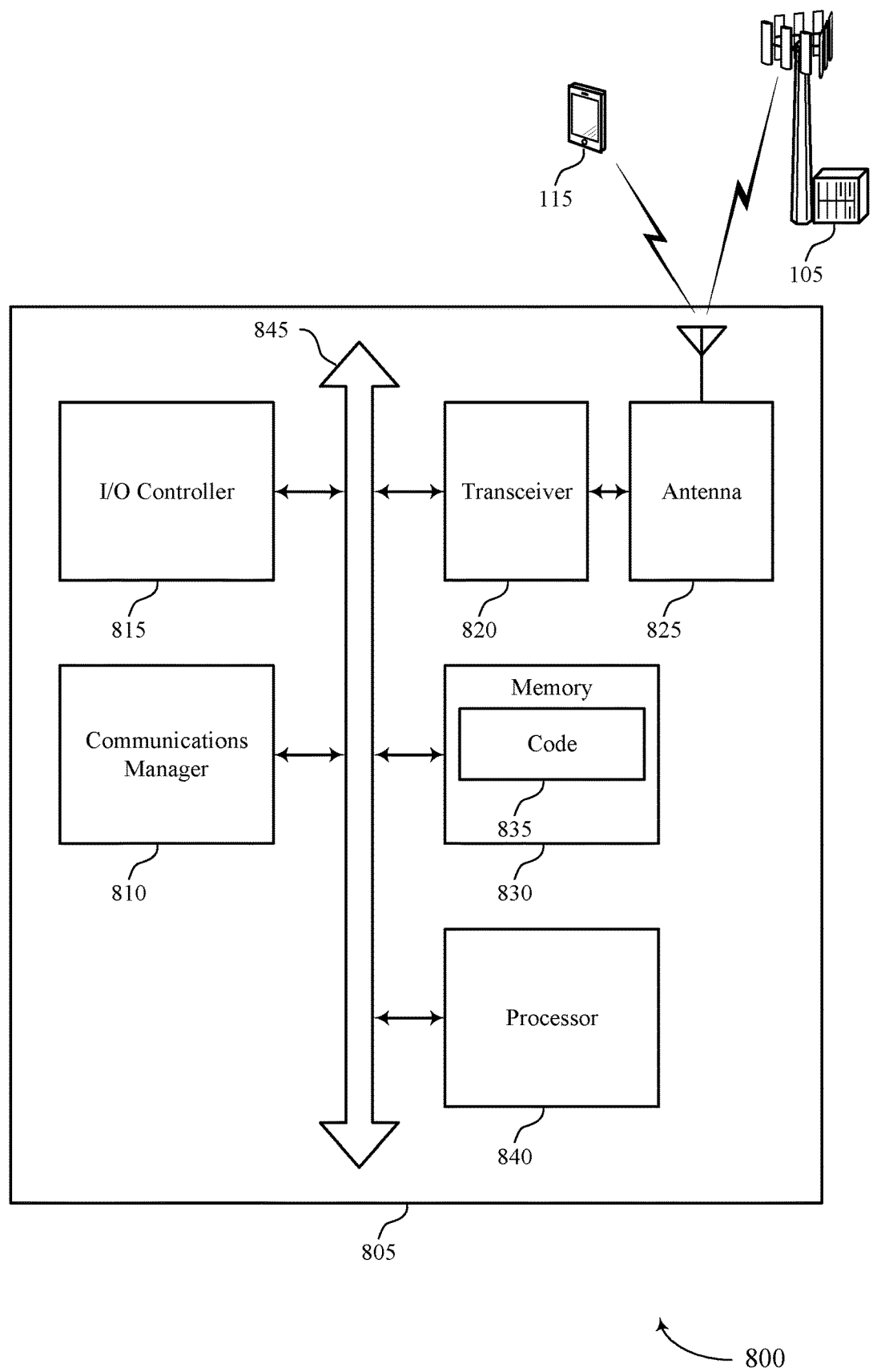
FIG. 8 shows a diagram of a system including a device that supports toolkit management during subscription disablement in accordance with aspects of the present disclosure.

FIG. 8 shows a diagram of a system 800 including a device 805 that supports toolkit management during subscription disablement in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a message to disable a subscription associated with a first SIM of a dual-SIM USIM card, where disabling the first SIM includes powering down a modem stack associated with the first SIM while maintaining power to the first SIM, configure a SIM toolkit manager associated with a SIM toolkit for the first SIM to a disabled state based on the message, and indicate to the first SIM that the SIM toolkit manager is in the disabled state.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting toolkit management during subscription disablement).

The code 835 may include instructions to implement aspects of the present disclosure, including instructions to support multi-subscription management. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
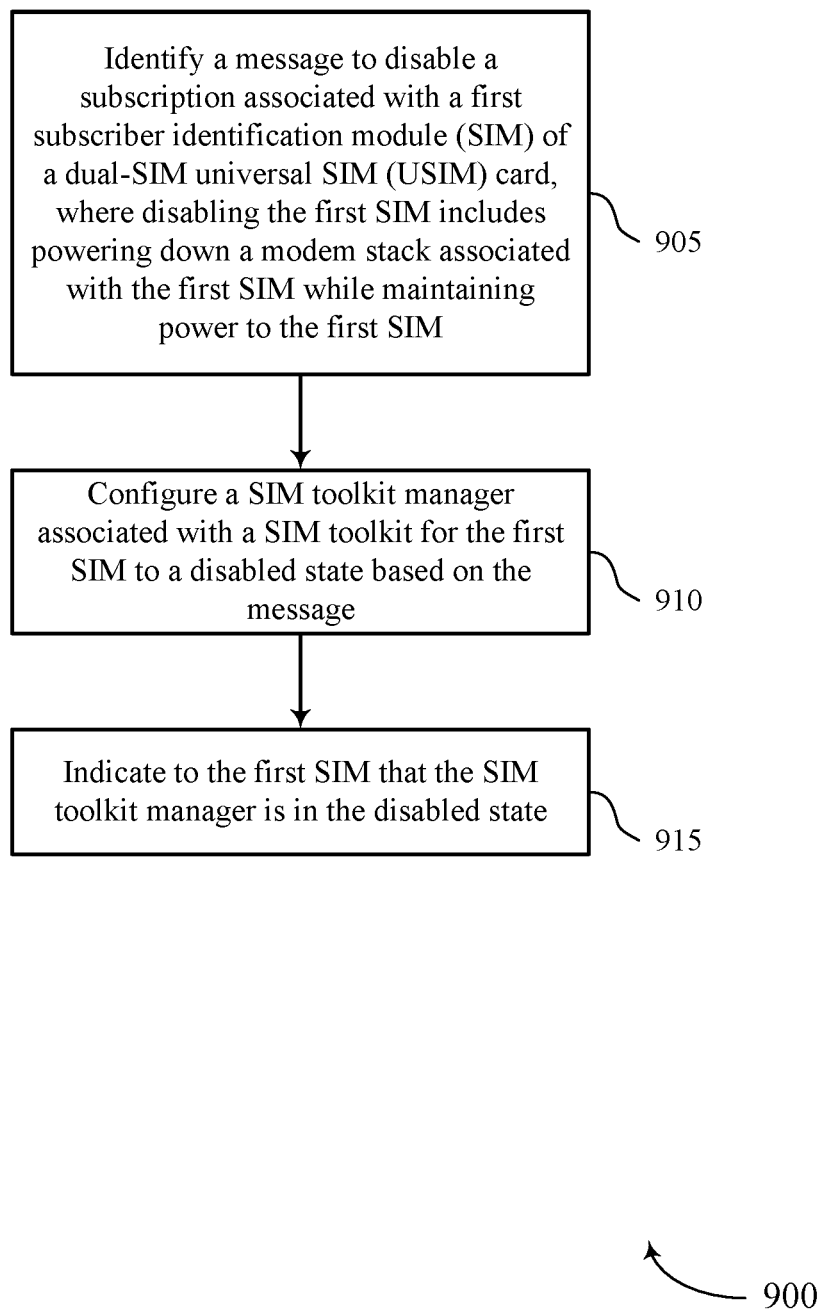
FIGS. 9 through 11 show flowcharts illustrating methods that support toolkit management during subscription disablement in accordance with aspects of the present disclosure.

FIG. 9 shows a flowchart illustrating a method 900 that supports toolkit management during subscription disablement in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may identify a message to disable a subscription associated with a first SIM of a dual-SIM USIM card, where disabling the first SIM includes powering down a modem stack associated with the first SIM while maintaining power to the first SIM. The operations of 905 may be performed according to the methods described herein. In some examples, aspects of the operations of 905 may be performed by a SIM disabling component as described with reference to FIGS. 5 through 8.

At 910, the UE may configure a SIM toolkit manager associated with a SIM toolkit for the first SIM to a disabled state based on the message. The operations of 910 may be performed according to the methods described herein. In some examples, aspects of the operations of 910 may be performed by a SIM toolkit disabling component as described with reference to FIGS. 5 through 8.

At 915, the UE may indicate to the first SIM that the SIM toolkit manager is in the disabled state. The operations of 915 may be performed according to the methods described herein. In some examples, aspects of the operations of 915 may be performed by a disabled state indication component as described with reference to FIGS. 5 through 8.

Figure 10:
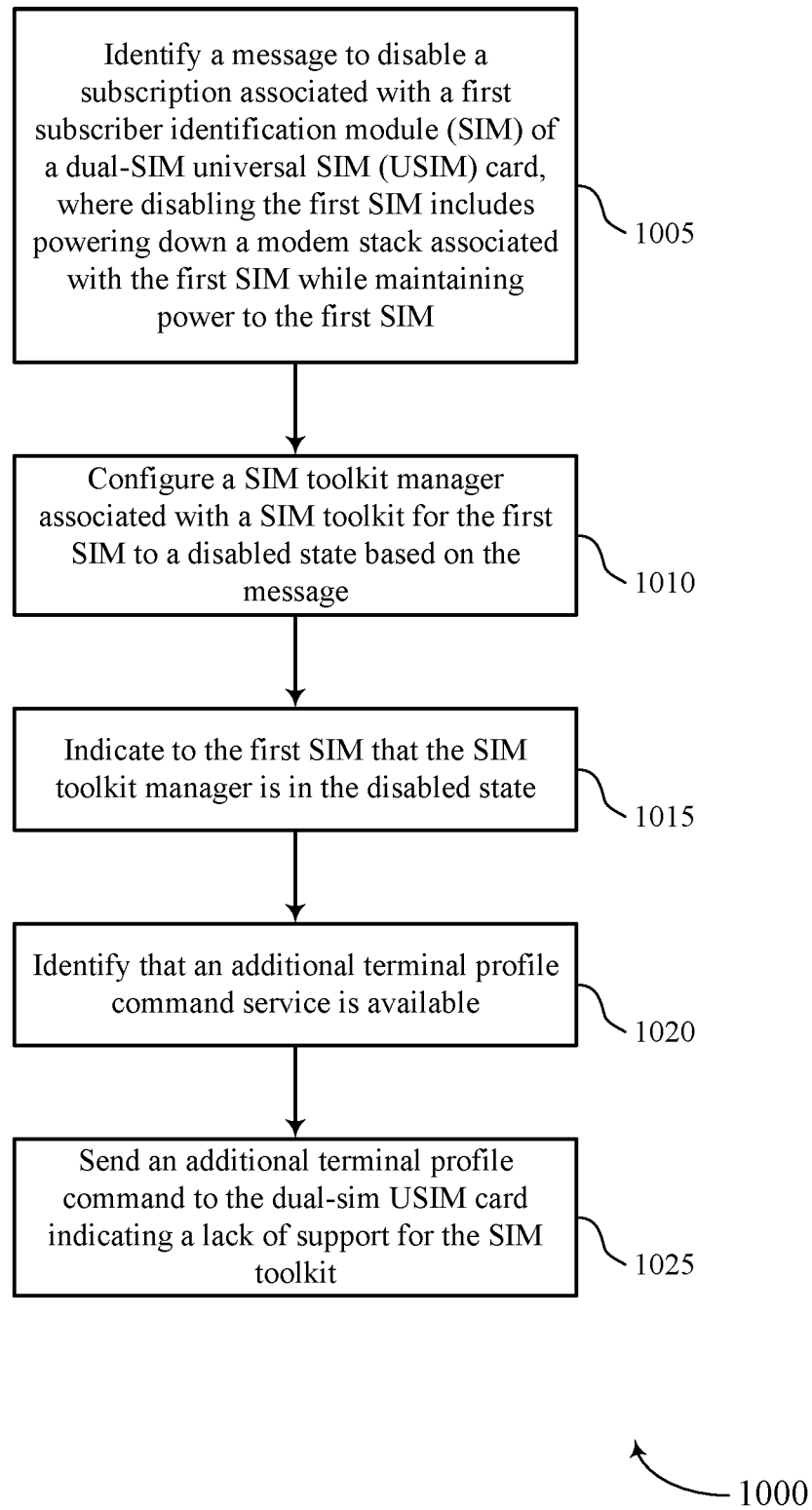

FIG. 10 shows a flowchart illustrating a method 1000 that supports toolkit management during subscription disablement in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may identify a message to disable a subscription associated with a first SIM of a dual-SIM USIM card, where disabling the first SIM includes powering down a modem stack associated with the first SIM while maintaining power to the first SIM. The operations of 1005 may be performed according to the methods described herein. In some examples, aspects of the operations of 1005 may be performed by a SIM disabling component as described with reference to FIGS. 5 through 8.

At 1010, the UE may configure a SIM toolkit manager associated with a SIM toolkit for the first SIM to a disabled state based on the message. The operations of 1010 may be performed according to the methods described herein. In some examples, aspects of the operations of 1010 may be performed by a SIM toolkit disabling component as described with reference to FIGS. 5 through 8.

At 1015, the UE may indicate to the first SIM that the SIM toolkit manager is in the disabled state. The operations of 1015 may be performed according to the methods described herein. In some examples, aspects of the operations of 1015 may be performed by a disabled state indication component as described with reference to FIGS. 5 through 8.

At 1020, the UE may identify that an additional terminal profile command service is available. The operations of 1020 may be performed according to the methods described herein. In some examples, aspects of the operations of 1020 may be performed by an additional terminal profile command component as described with reference to FIGS. 5 through 8.

At 1025, the UE may send an additional terminal profile command to the dual-sim USIM card indicating a lack of support for the SIM toolkit. The operations of 1025 may be performed according to the methods described herein. In some examples, aspects of the operations of 1025 may be performed by an additional terminal profile command component as described with reference to FIGS. 5 through 8.

Figure 11:
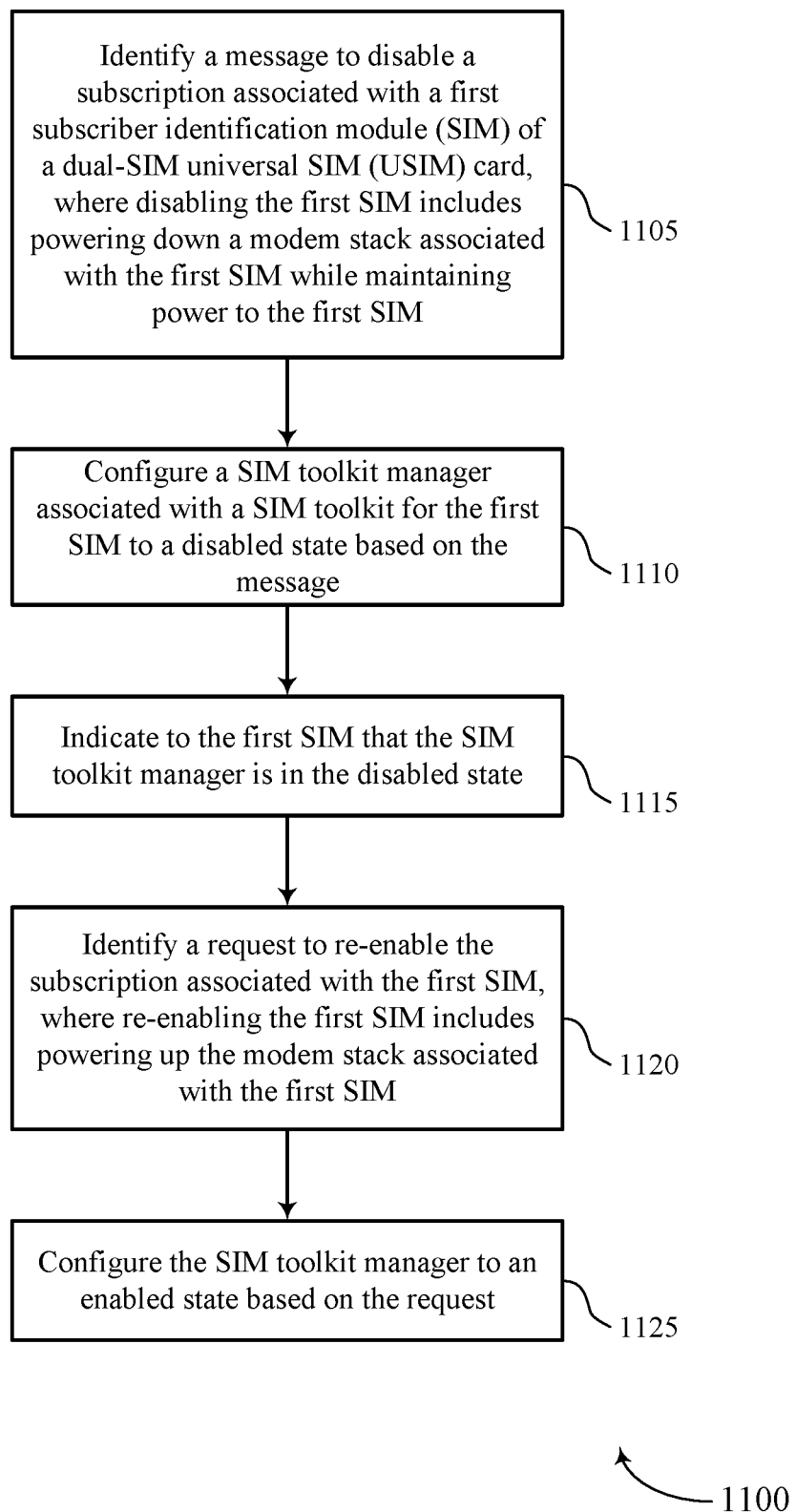

FIG. 11 shows a flowchart illustrating a method 1100 that supports toolkit management during subscription disablement in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may identify a message to disable a subscription associated with a first SIM of a dual-SIM USIM card, where disabling the first SIM includes powering down a modem stack associated with the first SIM while maintaining power to the first SIM. The operations of 1105 may be performed according to the methods described herein. In some examples, aspects of the operations of 1105 may be performed by a SIM disabling component as described with reference to FIGS. 5 through 8.

At 1110, the UE may configure a SIM toolkit manager associated with a SIM toolkit for the first SIM to a disabled state based on the message. The operations of 1110 may be performed according to the methods described herein. In some examples, aspects of the operations of 1110 may be performed by a SIM toolkit disabling component as described with reference to FIGS. 5 through 8.

At 1115, the UE may indicate to the first SIM that the SIM toolkit manager is in the disabled state. The operations of 1115 may be performed according to the methods described herein. In some examples, aspects of the operations of 1115 may be performed by a disabled state indication component as described with reference to FIGS. 5 through 8.

At 1120, the UE may identify a request to re-enable the subscription associated with the first SIM, where re-enabling the first SIM includes powering up the modem stack associated with the first SIM. The operations of 1120 may be performed according to the methods described herein. In some examples, aspects of the operations of 1120 may be performed by a SIM toolkit enabling component as described with reference to FIGS. 5 through 8.

At 1125, the UE may configure the SIM toolkit manager to an enabled state based on the request. The operations of 1125 may be performed according to the methods described herein. In some examples, aspects of the operations of 1125 may be performed by a SIM toolkit enabling component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for multi-subscription management, comprising:
    identifying a message to disable a subscription associated with a first subscriber identification module (SIM) of a dual-SIM universal SIM (USIM) card, wherein disabling the first SIM comprises powering down a modem stack associated with the first SIM while maintaining power to the first SIM;
    configuring a SIM toolkit manager associated with a SIM toolkit for the first SIM to a disabled state based at least in part on the message; and
    indicating to the first SIM that the SIM toolkit manager is in the disabled state.

2. The method of claim 1, further comprising:
    identifying that an additional terminal profile command service is available; and
    sending an additional terminal profile command to the dual-sim USIM card indicating a lack of support for the SIM toolkit.

3. The method of claim 2, further comprising:
    receiving, from the dual-sim USIM card, an error notification in response to the additional terminal profile command;
    resetting the first SIM to a recovery mode based at least in part on the error notification, wherein the resetting comprises a universal integrated circuit card (UICC) initialization; and
    refraining from sending, in response to the UICC initialization, a terminal profile command indicating support for the SIM toolkit.

4. The method of claim 2, wherein the additional terminal profile command comprises a set of terminal profile bytes set to zero.

5. The method of claim 2, wherein the additional terminal profile command service, when available, is capable of triggering with the SIM toolkit manager in the disabled state.

6. The method of claim 1, further comprising:
    identifying that the dual-sim USIM card is inactive;
    resetting the first SIM to a recovery mode, wherein the resetting comprises a universal integrated circuit card (UICC) initialization; and
    refraining from sending, in response to the UICC initialization, a terminal profile command indicating support for the SIM toolkit, wherein configuring the SIM toolkit manager comprises the refraining.

7. The method of claim 1, further comprising:
    receiving, from the SIM toolkit manager, a request for a proactive command based at least in part on the first SIM having a faulty configuration;
    retrieving the proactive command based at least in part on the request; and
    sending a permanent error response to the first SIM based at least in part on the first SIM having the faulty configuration.

8. The method of claim 1, wherein configuring the SIM toolkit manager to the disabled state comprises:
  disabling a proactive polling for the SIM toolkit manager.

9. The method of claim 1, further comprising:
  identifying a request to re-enable the subscription associated with the first SIM, wherein re-enabling the first SIM comprises powering up the modem stack associated with the first SIM; and
  configuring the SIM toolkit manager to an enabled state based at least in part on the request.

10. An apparatus for multi-subscription management, comprising: a processor, memory coupled with the processor; and instructions stored in the memory and executable by the processor to cause the apparatus to:
  identify a message to disable a subscription associated with a first subscriber identification module (SIM) of a dual-SIM universal SIM (USIM) card, wherein disabling the first SIM comprises powering down a modem stack associated with the first SIM while maintaining power to the first SIM;
  configure a SIM toolkit manager associated with a SIM toolkit for the first SIM to a disabled state based at least in part on the message; and
  indicate to the first SIM that the SIM toolkit manager is in the disabled state.

11. The apparatus of claim 10, wherein the instructions are further executable by the processor to cause the apparatus to:
  identify that an additional terminal profile command service is available; and
  send an additional terminal profile command to the dual-sim USIM card indicating a lack of support for the SIM toolkit.

12. The apparatus of claim 11, wherein the instructions are further executable by the processor to cause the apparatus to:
  receive, from the dual-sim USIM card, an error notification in response to the additional terminal profile command;
  reset the first SIM to a recovery mode based at least in part on the error notification, wherein the resetting comprises a universal integrated circuit card (UICC) initialization; and
  refrain from sending, in response to the UICC initialization, a terminal profile command indicating support for the SIM toolkit.

13. The apparatus of claim 11, wherein the additional terminal profile command comprises a set of terminal profile bytes set to zero.

14. The apparatus of claim 11, wherein the additional terminal profile command service, when available, is capable of triggering with the SIM toolkit manager in the disabled state.

15. The apparatus of claim 10, wherein the instructions are further executable by the processor to cause the apparatus to:
  identify that the dual-sim USIM card is inactive;
  reset the first SIM to a recovery mode, wherein the resetting comprises a universal integrated circuit card (UICC) initialization; and
  refrain from sending, in response to the UICC initialization, a terminal profile command indicating support for the SIM toolkit, wherein configuring the SIM toolkit manager comprises the refraining.

16. The apparatus of claim 10, wherein the instructions are further executable by the processor to cause the apparatus to:
  receive, from the SIM toolkit manager, a request for a proactive command based at least in part on the first SIM having a faulty configuration;
  retrieve the proactive command based at least in part on the request; and
  send a permanent error response to the first SIM based at least in part on the first SIM having the faulty configuration.

17. The apparatus of claim 10, wherein the instructions to configure the SIM toolkit manager to the disabled state are executable by the processor to cause the apparatus to:
  disable a proactive polling for the SIM toolkit manager.

18. The apparatus of claim 10, wherein the instructions are further executable by the processor to cause the apparatus to:
  the instructions to identify a request to re-enable the subscription associated with the first SIM, wherein re-enabling the first SIM are executable by the processor to cause the apparatus to power up the modem stack associated with the first SIM; and
  configure the SIM toolkit manager to an enabled state based at least in part on the request.

19. An apparatus for multi-subscription management, comprising: means for identifying a message to disable a subscription associated with a first subscriber identification module (SIM) of a dual-SIM universal SIM (USIM) card, wherein disabling the first SIM comprises powering down a modem stack associated with the first SIM while maintaining power to the first SIM; means for configuring a SIM toolkit manager associated with a SIM toolkit for the first SIM to a disabled state based at least in part on the message; and means for indicating to the first SIM that the SIM toolkit manager is in the disabled state.

20. The apparatus of claim 19, further comprising:
  means for identifying that an additional terminal profile command service is available; and
  means for sending an additional terminal profile command to the dual-sim USIM card indicating a lack of support for the SIM toolkit.

* * * * *